United States Patent
Esteverena

[11] Patent Number: 5,924,415
[45] Date of Patent: Jul. 20, 1999

[54] SOLAR GRILL

[76] Inventor: Carlos A. Esteverena, 153 Milk St., #8, Westborough, Mass. 01581

[21] Appl. No.: 09/032,875

[22] Filed: Mar. 2, 1998

[51] Int. Cl.$^6$ ...................................................... F24J 3/02
[52] U.S. Cl. .......................... 126/681; 126/608; 126/700; 126/698
[58] Field of Search .................... 126/680, 681, 126/682, 698, 608, 569, 29, 30, 25 A, 700

[56] References Cited

U.S. PATENT DOCUMENTS

| | | |
|---|---|---|
| 696,326 | 3/1902 | De La Garza . |
| 1,074,219 | 9/1913 | Skiff ........................................ 126/681 |
| 1,081,098 | 12/1913 | De La Garza . |
| 2,798,478 | 7/1957 | Tarcici ..................................... 126/680 |
| 3,938,497 | 2/1976 | Andrassy .................................. 126/681 |
| 4,294,511 | 10/1981 | Krisst et al. . |
| 4,442,828 | 4/1984 | Takeuchi et al. . |
| 4,561,425 | 12/1985 | Long et al. . |
| 4,619,244 | 10/1986 | Marks ...................................... 126/680 |
| 5,054,467 | 10/1991 | Videtto . |

*Primary Examiner*—Carl D. Price
*Attorney, Agent, or Firm*—Cantor Colburn LLP

[57] ABSTRACT

A solar cooker which has at least one biconvex lens which can concentrate solar rays onto an item to be cooked. In addition, the solar cooker utilizes a series of pulleys to rotate the lens from an angle of 45° on each side of the sun's zenith in order to effectively collect the sun's rays at different times of the day.

6 Claims, 2 Drawing Sheets

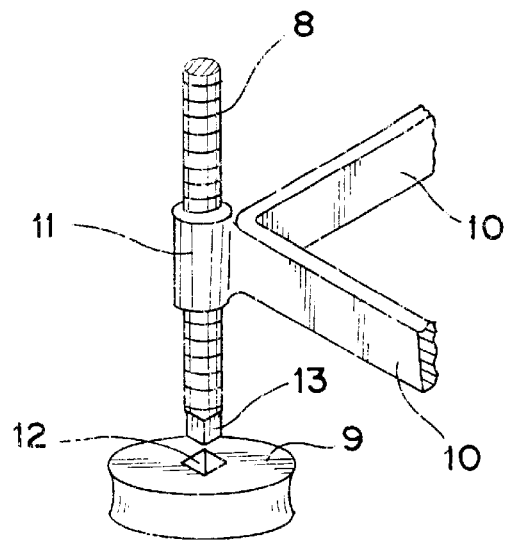
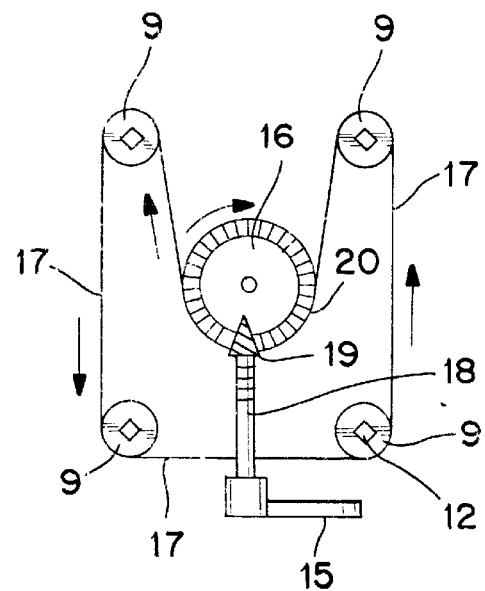
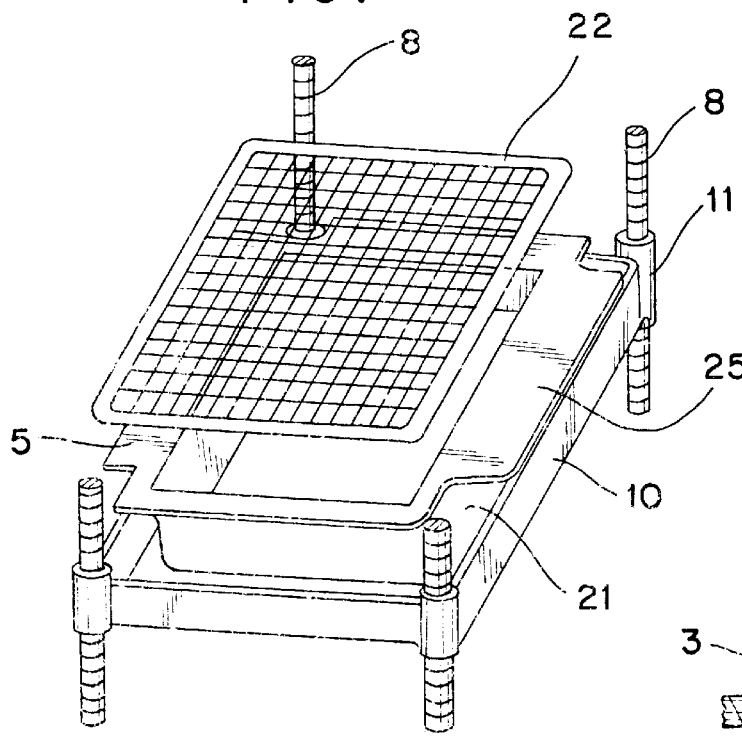
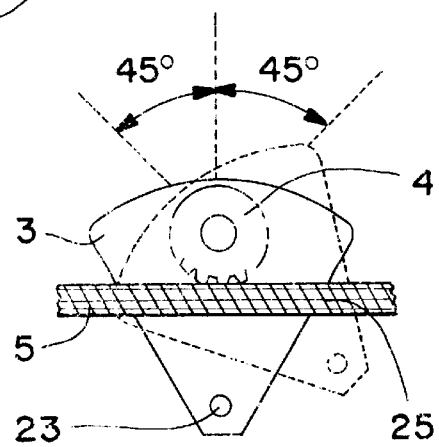

SOLAR GRILL

BACKGROUND OF THE INVENTION

This invention relates, in general, to cooking devices, and, in particular, to cooking devices which utilizes the sun for supplying heat.

DESCRIPTION OF THE PRIOR ART

In the prior art various types of solar grills have been proposed. For example, U.S. Pat. No. 4,249,511 to Krisst et al discloses a solar grill which has an angularly adjustable parabolic solar collector which utilizes a screen aligned along the line of sight parallel to the collector axis to efficiently position the collector.

U.S. Pat. No. 4,442,828 to Takeuchi et al discloses a solar cooker having an inner and outer glass tube coated with a selective absorption film to increase the power of the sun's rays for cooking.

U.S. Pat. No. 4,561,425 to Long et al discloses a solar cooking device having a flat array of concentric mirrors tilted to focus at a small area.

U.S. Pat. No. 5,054,467 to Videtto, Jr. discloses a solar hot dog cooker which has a M-shaped holder for the hot dogs which are then covered by a dark, solar energy absorbing flat plate.

SUMMARY OF THE INVENTION

The present invention is directed to a solar cooker which has at least one biconvex lens which can concentrate solar rays onto an item to be cooked. In addition, the solar cooker utilizes a series of pulleys to rotate the lens from an angle of 45° on each side of the sun's zenith in order to effectively collect the sun's rays at different times of the day.

It is an object of the present invention to provide a new and improved solar cooker.

It is an object of the present invention to provide a new and improved solar cooker which utilizes a biconvex lens to collect and focus the sun's rays for cooking.

It is an object of the present invention to provide a new and improved solar cooker which has an adjustment mechanism which adjusts to collect the sun's rays at different times of the day.

These and other objects and advantages of the present invention will be fully apparent from the following description, when taken in connection with the annexed drawings.

BRIEF DESCRIPTION OF THE DRAWINGS

FIG. 2 is a partial view of one of the threaded supports for the present invention.

FIG. 3 is a top view of the pulleys and belt drive used with the present invention.

FIG. 4 is a perspective view showing the position of the grill and grease drip pan used with the present invention.

FIG. 5 is a front view of one of the lenses of the present invention showing the rotation of the lens through an arc of 45° on each side of its centerline.

DESCRIPTION OF THE PREFERRED EMBODIMENT

Figure 1:
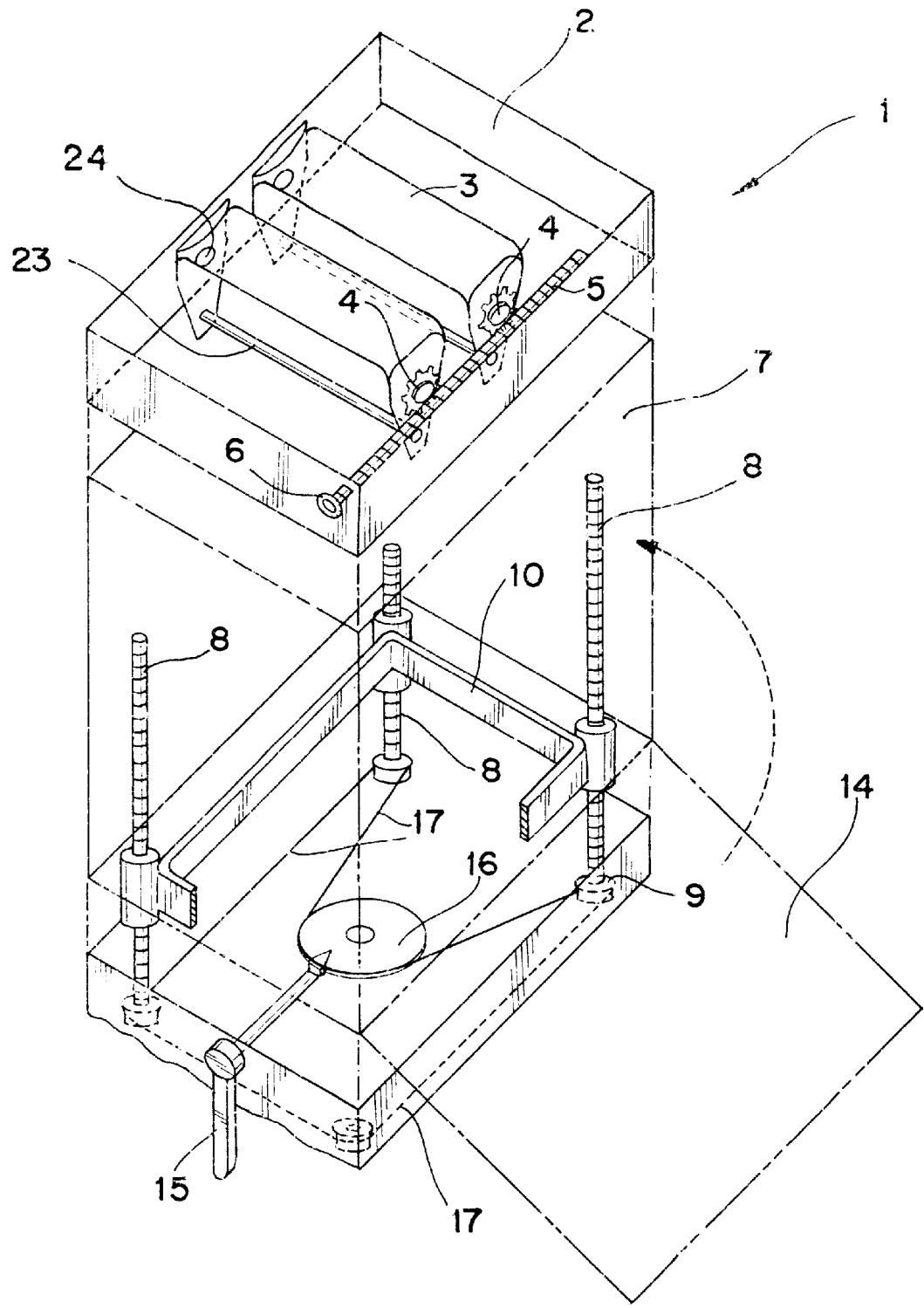
FIG. 1 is an exploded perspective view of the present invention.

Referring now to the drawings in greater detail, FIG. 1 shows the solar grill 1 of the present invention. The grill has a housing 7 to support all the components of the grill with a drop down door 14 which can be made of transparent plastic or glass so the food being cooked can be observed. The housing 7 could be made from any type of material such as, but not limited to, wood, metal or plastic. At the top of the housing 7, the solar heating container 2 is attached using any conventional method.

Inside the solar heating container 2 are a plurality of biconvex lenses 3. Only two of the lenses are shown in FIG. 1, however any number of lenses can be used. Each lens is pivotally attached to a side of the solar heating container 2 at 24 by any conventional means. At the other end of the lens 3 a gear 4 is secured to the end of the lens, and toward the bottom of the lens 3 a heating rod 23 is secured in any conventional manner.

A rod 5 having a worm gear thereon is journaled at each end of the solar heating container 2 and the rod has a turning means 6 of any conventional shape so that by turning the rod 5, the threads 25 on the rod 5 will engage and rotate the gear 4 on the ends of the lenses 3, as shown in FIG. 5. The rotation of the lenses 3 is limited to 45° on each side of the vertical orientation of the lens.

The ability of the lenses to rotate 45° on each side of the vertical orientation of the lens (or the zenith) will allow a user to rotate the lenses as the earth rotates, and thereby track the sun's rays to efficiently gather the rays for cooking no matter what time of the day it is.

At the bottom of each lens 3 is a heating rod 23. As the sun's rays pass through the lenses, they will be focused by the lenses onto the rods 23 which will, in turn, heat the rods. The heat from the rods will in turn be passed onto the food that is placed on the grill and the food will be cooked by the heat emanating from the rods 23. Obviously, the rods 23 should be positioned at the focal point of the lenses to obtain the maximum efficiency of the solar grill.

The lenses 3 can be made from any material that can transfer the rays of the sun such as, but not limited to, plastic or glass. In addition, the material can be a red color so only the infrared rays are transferred if desired.

As shown in FIG. 4, the cooking surface 22 on which the food will be placed is a conventional wire grid with openings so any grease from the food will drop into the grease collector 21. The grease collector 21 and the cooking surface 22 are placed on top of the vertical adjusting crib or support 10. The grease collector 21 has a rim 25 which will overlie the top of the crib 10 and the grease collector 21 and the cooking surface 22 will be held in place by gravity. The materials of the grease collector 21 and the cooking surface 22 can be any conventional materials that will serve their intended purpose.

In order to adjust the distance of the cooking surface 22 (and any food placed thereon) from the lenses 3 and the heating rods 23, a vertical adjustment mechanism, shown in FIGS. 1–3, is used. This mechanism will raise the cooking surface 22 toward the lenses 3 and the heating rods 23 to increase the cooking temperature, or will lower the cooking surface 22 away from the lenses 3 and the heating rods 23 to decrease the cooking temperature.

At each of the corners of the housing 7 a threaded rod 8 is positioned. The rods 8 have a square or rectangular end 13 which will engage a similarly shaped aperture 12 in a pulley 9. Attached to the threaded rods 8 is a lifting frame 10. The frame 10 has a journal 11 which has internal threads to match the external threads on the rod 8. As the pulleys 9 are turned in clockwise direction, the rods 8 will rotate, due to the engagement between end 13 on the rod and the aperture 12 in the pulleys. As the threaded rods 8 are rotated the journals will "ride" up the threaded rods 8, thereby raising the frame 10 and the cooking surface 22 toward the lenses 3 and the heating rods 23 to increase the cooking temperature.

If the pulleys 9 are turned in counterclockwise direction, the rods 8 will rotate, due to the engagement between end 13 on the rod and the aperture 12 in the pulleys. As the threaded rods 8 are rotated the journals will "ride" down the threaded rods 8, thereby lowering the frame 10 and the cooking surface 22 away from the lenses 3 and the heating rods 23 to decrease the cooking temperature.

In order to rotate the pulleys 9, a belt 17 is passed around the pulleys, as shown in FIG. 3, and around a central control gear 16. The central control gear 16 has teeth 20 positioned on its top surface which will engage with the teeth on the conical end 19. The conical end 19 is affixed to a shaft 18 which has an operating handle 15 affixed to one end. As the handle 15 is turned in one direction, the end 19 will engage and turn central control gear 16. The central control gear 16 will rotate the belt 17 in the direction shown by the arrows in FIG. 3. The rotation of the belt will rotate the pulleys 9 which will raise the frame 10, as explained above.

As the handle 15 is turned in the other direction, the end 19 will engage and turn central control gear 16. The central control gear 16 will rotate the belt 17 in the opposite direction as shown by the arrows in FIG. 3. The rotation of the belt will rotate the pulleys 9 which will lower the frame 10, as explained above.

The handle 15, in the preferred embodiment, will incorporate a conventional ratchet mechanism, which since this type of mechanism is well known, will not be further described. The ratchet mechanism, as is well known, will allow turning of the handle in only one direction. If it is necessary to turn the handle in the opposite direction, a control must be turned which will allow the handle to be turned only in the opposite direction. By using the ratchet mechanism with the handle 15, the frame 10 will remain in whatever position it is placed. This will eliminate the need for a latch to hold the frame in its adjusted position.

However, it should be noted, even though the ratchet mechanism is the preferred embodiment, the height of the frame can be adjusted with a simple handle and a holding mechanism to hold the handle in whatever position desired by the user.

It should be noted that only a single belt 17 is shown in the drawings, however additional belts can be used if necessary and the preferred embodiment uses three belts in order to obtain enough traction to raise and lower the frame 10.

Although the Solar Grill and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A solar cooking unit comprising:
    a support housing having a top, bottom sides, a front and a back,
    solar radiation collector attached adjacent said top of said support housing,
    an adjusting device attached to said solar radiation collector for selective angular movement of said solar radiation collector,
    a cooking support surface attached to said support housing adjacent said bottom of said support housing,
    a second adjusting device attached to said cooking support surface for raising and lowering said support surface toward and away from said solar radiation collector;
    wherein said solar radiation collector comprises at least one lens for collecting and focusing solar rays;
    wherein said solar radiation collector includes a heating rod attached thereto, and
    said solar radiation collector focuses solar rays onto said heating rod.

2. A solar cooking unit comprising:
    a support housing having a top, bottom sides, a front and a back,
    solar radiation collector attached adjacent said top of said support housing,
    an adjusting device attached to said solar radiation collector for selective angular movement of said solar radiation collector,
    a cooking support surface attached to said support housing adjacent said bottom of said support housing,
    a second adjusting device attached to said cooking support surface for raising and lowering said support surface toward and away from said solar radiation collector;
    wherein said adjusting device attached to said solar radiation collector for selective angular movement of said solar radiation collector comprises:
        a threaded rod secured at opposite ends to said support housing,
        a gear attached to said solar radiation collector for engaging said threaded rod,
    whereby rotating said threaded rod rotates said gear which in turn rotates said solar radiation collector.

3. A solar cooking unit comprising:
    a support housing having a top, bottom sides, a front and a back,
    solar radiation collector attached adjacent said top of said support housing,
    an adjusting device attached to said solar radiation collector for selective angular movement of said solar radiation collector,
    a cooking support surface attached to said support housing adjacent said bottom of said support housing,
    a second adjusting device attached to said cooking support surface for raising and lowering said support surface toward and away from said solar radiation collector;
    wherein said adjusting device attached to said solar radiation collector for selective angular movement of said solar radiation collector rotates said solar radiation collector through an angle of at least 45°.

4. A solar cooking unit comprising:
    a support housing having a top, bottom sides, a front and a back,
    solar radiation collector attached adjacent said top of said support housing,
    an adjusting device attached to said solar radiation collector for selective angular movement of said solar radiation collector,
    a cooking support surface attached to said support housing adjacent said bottom of said support housing, a second adjusting device attached to said cooking support surface for raising and lowering said support surface toward and away from said solar radiation collector;

wherein said second adjusting device attached to said cooking support surface for raising and lowering said support surface comprises:
- a plurality of threaded rods secured adjacent said bottom of said support housing,
- each said threaded rod having a length with an upper end and a lower end,
- each lower end being non-rotatably attached to a pulley,
- a support frame,
- said support frame having a threaded support for connecting said support frame to each of said threaded rods,
- said threaded support connecting said support frame to each of said threaded rods so that as said rods are rotated by said pulleys, said support frame will move along the length of said rods.

5. The solar cooking unit as claimed in claim 4, wherein said second adjusting device includes;
- a control gear,
- at least one belt attached to said control gear and said pulleys, and
- a linkage for rotating said control gear.

6. The solar cooking unit as claimed in claim 5, wherein said linkage for rotating said control gear is a rod having a gear on one end,
- said gear on one end engaging teeth on said control gear for rotating said control gear when said rod having a gear on one end is rotated, and
- a handle for rotating said rod.

* * * * *

UNITED STATES PATENT AND TRADEMARK OFFICE
CERTIFICATE OF CORRECTION

PATENT NO. : 5,924,415
DATED : July 20, 1999
INVENTOR(S) : Carlos A. Esteverena

It is certified that error appears in the above-identified patent and that said Letters Patent are hereby corrected as shown below:

Column 2, line 60, delete "comers" and insert therefor --corners--

Signed and Sealed this

First Day of May, 2001

Attest:

NICHOLAS P. GODICI

*Attesting Officer*  Acting Director of the United States Patent and Trademark Office